(12) United States Patent
Liu et al.

(10) Patent No.: US 10,365,126 B2
(45) Date of Patent: Jul. 30, 2019

(54) DISTRIBUTED OPTICAL FIBER DISTURBANCE POSITIONING SYSTEM BASED ON THE ASYMMETRIC DUAL MACH-ZEHNDER INTERFERENCE, AND POSITIONING METHOD THEREOF

(71) Applicant: Tianjin University, Tianjin (CN)

(72) Inventors: Kun Liu, Tianjin (CN); Tiegen Liu, Tianjin (CN); Junfeng Jiang, Tianjin (CN); Chunyu Ma, Tianjin (CN); Tianjiao Chai, Tianjin (CN); Chang He, Tianjin (CN); Miao Tian, Tianjin (CN); Zhichen Li, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 15/567,076

(22) PCT Filed: Oct. 27, 2016

(86) PCT No.: PCT/CN2016/103521
§ 371 (c)(1),
(2) Date: Oct. 16, 2017

(87) PCT Pub. No.: WO2017/107657
PCT Pub. Date: Jun. 29, 2017

(65) Prior Publication Data
US 2018/0292240 A1 Oct. 11, 2018

(30) Foreign Application Priority Data
Dec. 25, 2015 (CN) .......................... 2015 1 0993836

(51) Int. Cl.
*G01D 5/353* (2006.01)
*G08B 13/186* (2006.01)
*G01H 9/00* (2006.01)

(52) U.S. Cl.
CPC ..... *G01D 5/35329* (2013.01); *G01D 5/35335* (2013.01); *G01H 9/004* (2013.01); *G08B 13/186* (2013.01)

(58) Field of Classification Search
CPC .......... G01D 5/35329; G01D 5/35335; G01H 9/004; G08B 13/186
(Continued)

(56) References Cited

U.S. PATENT DOCUMENTS 5,323,258 A * 6/1994 Tsushima ............... H04B 10/61
398/152
8,094,292 B2 * 1/2012 Park ................... G01B 9/02028
356/4.01

\* cited by examiner

*Primary Examiner* — Seung C Sohn
(74) *Attorney, Agent, or Firm* — George G. Wang; Bei & Ocean

(57) ABSTRACT

A distributed optical fiber disturbance positioning system based on the asymmetric dual Mach-Zehnder interference, unlike traditional dual Mach-Zehnder distributed optical fiber disturbance sensing system, the present invention adopts two narrow-bandwidth optical sources (1a, 1b) and adopts corresponding DWDM (3a, 3b) before the detector (4a, 4b) to filter the backscatter noise of the optical fiber, and can solve the problems of having too low SNR due to backscatter influence when the sensing distance is long. The present invention also provides a positioning method for applying the system, which obtains the TFD of the disturbance frame signals by using the time-frequency analysis method based on the short-term average frequency, and takes the points near the point of maximum frequency as the effective signal segment for performing cross-correlation time delay estimation, thus obtaining the delay, and the disturbance position. The method of the invention positions the asymmetric disturbance frame signals in the systems, thus having a high positioning accuracy and reliability.

5 Claims, 4 Drawing Sheets

(58) Field of Classification Search
USPC .................................................. 250/227.19
See application file for complete search history.

DISTRIBUTED OPTICAL FIBER DISTURBANCE POSITIONING SYSTEM BASED ON THE ASYMMETRIC DUAL MACH-ZEHNDER INTERFERENCE, AND POSITIONING METHOD THEREOF

TECHNICAL FIELD

The present invention relates to the sensing and testing technical field, and in particular to a distributed optical fiber disturbance positioning system based on the asymmetric dual Mach-Zehnder interference.

BACKGROUND OF THE INVENTION

Dual Mach-Zehnder distributed optical fiber disturbance sensing system adopts optical wave to achieve intrusion detection and position, has the advantages of long-distance monitoring, high-precision positioning, low energy dependence, high environmental tolerance, anti-electromagnetic interference, corrosion resistance, etc. Recently, Shangran Xie, et, al. (*Positioning error prediction theory for dual Mach-Zehnder interferometric vibration sensor, Journal of Lightwave Technology*, 2011, 29:362-368) analyzes the influence of various noise on the positioning accuracy, and predicts the positioning accuracy of the system under different SNR (short for Signal to Noise Ratio); the article of Qinnan Chen, et, al. (*An Elimination Method of Polarization-Induced Phase Shift and Fading in Dual Mach-Zehnder interferometry Disturbance Sensing System, Journal of Lightwave Technology*, 2013, 31:3135-3141) discloses an elimination method of compensating the polarized noise in the system thus improving the positioning accuracy. The article of Xiangdong Huang, et, al. (*Configurable Filter-Based Endpoint Detection in DMZI Vibration System, Photoics Technology Letters*, 2014, 26:1956-1959) adopts full-phase filter to accurately position the disturbance start point.

Currently, the positioning accuracy of dual Mach-Zehnder distributed optical fiber disturbance sensing system can fall within the range of 20 m (sampling rate 10 MS/s, theoretical precision is 10 m) when sensing distance is short. However, due to the limitation of optical structure of the system, backscatter noise of the optical fiber has more and more obvious influence on SNR with the increase of sensing distance, which seriously affects the system positioning accuracy and restricts the system sensing distance.

SUMMARY OF THE INVENTION

The object of the present invention is to solve the problem of dual Mach-Zehnder distributed optical fiber disturbance sensing system having low SNR when sensing distance is relatively long due to the influence of backscatter, and provides a asymmetric dual Mach-Zehnder distributed optical fiber disturbance sensing system. The system uses optical filtering method to eliminate the optical fiber backscattering affects on the signals, thus greatly improving the SNR when applying the system in long distance.

The technical schemes of the present invention are:

A distributed optical fiber disturbance positioning system based on the asymmetric dual Mach-Zehnder interference, wherein the system comprises:

Optical source: two narrow-bandwidth distributed feedback lasers (short for DFB) into 1550 nm wavelength range, wavelength difference of two optical sources is larger than the wavelength interval of dense wavelength division multiplexer (short for DWDM) of the system;

Optical circulator: transmitting the light emitted from the optical source to the material to be tested and collecting the reflected signal light;

DWDM: two commercial single-channel DWDMs into the 1500 nm operating wavelength range, each spectral transmission range thereof only comprises wavelength of one optical source;

Photoelectric detector (PD): InGaAs PD, for receiving optical signals and performing photoelectric conversion and amplification;

Optical fiber coupler: 3 dB optical fiber coupler of which coupling ratio is 1:2;

Polarization controller: regulating polarization states of two interference signals to ensure signal visibility;

Sensing cable: G.652D communication cable, for acquiring external disturbance and transmitting optical signals;

Data acquisition (DAQ) card: dual-channel DAQ card with sampling rate of 10 MS/s, for collecting the voltage signals of two PDs and then transmitting them into computer for processing;

Processing unit: including general computer and embedded computing system, the process unit is used for processing the interference signals received by the DAQ card for obtaining the disturbance information.

Further, backscattering light filter composed by the optical source and corresponding DWDM is a combination of any wavelength light source and optical filter.

Further, optical fiber couplers can be adopted instead of optical circulators when large optical source power is applied.

The present invention also provides a positioning method for applying the system, which obtains the time-frequency distribution (short for TFD) of the disturbance frame signals by using the time-frequency analysis method based on the short-term average frequency, and takes the points near the point of maximum frequency as the effective signal segment for performing cross-correlation time delay estimation, thus obtaining the delay d, and the disturbance position x. The specific algorithm flow is as follows:

(1) Setting a pair of thresholds $\delta_1$, $\delta_2$ and an amplitude threshold $\varepsilon$, wherein $\delta_1<0$, $\delta_2>0$, and $|\delta_1|=|\delta_2|=\varepsilon$ (for filtering the circuit noise, $2\varepsilon$ is to be greater than the amplitude of noise). For any threshold, the formula of solving the over-threshold point position is as follows:

$$\begin{cases} C_i(m) = m \cdot \phi\{[x(m) - \delta_i < 0] \& [x(m+1) - \delta_i > 0]\} \\ \phi[x(n)] = \begin{cases} 1, & x(n) > 0 \\ 0, & x(n) = 0 \end{cases}, m, n \in [1, N-1], i = 1, 2 \end{cases}$$

Wherein, x(m) is the amplitude of $m^{th}$ point in the signal segment, $C_i(m)$ is the over-threshold point position, substituting $\delta=\delta_1$, $\delta=\delta_2$ into above formula and sequentially processing the signals with a frame point N so as to achieve respective over-threshold point positions $C_i(m)$ and $C_2(n)$, m,n∈ [1, N−1];

(2) Sequencing the items greater than 0 between $C_i(m)$ and $C_2(n)$ from small to large, and selecting the two adjacent items satisfying $C_i(m)<C_2(n)$ to determine zero-crossing position Z(k) of signal, wherein Z(k)=[$C_i(m)+C_2(n)$]/2, k=1, 2, 3 . . . , the short-term average frequency of the signals located between two adjacent zero-crossing position can be expressed as: f(k)=1/[Z(k+1)−Z(k)];

(3) Performing spline differential fitting for three times on the solved short-term average frequency points, and the fitting curve represents the time-frequency distribution of the signal; taking the points near the point of maximum frequency as the effective signal segment, and performing normalization on the time-frequency distribution curve of two effective signals and performing cross-correlation estimation in the time domain thereof, thus obtaining the delay d, and the disturbance position x.

Further, the method of the present invention adopts any prior time-frequency analysis method to achieve the disturbance frame signals in the TFD curve of the disturbance frame signals, and then obtains delay d, and the disturbance position x.

The advantages of the present invention are: unlike traditional dual Mach-Zehnder distributed optical fiber disturbance sensing system, the present invention adopts two narrow-bandwidth optical sources and adopts corresponding DWDMs before the detectors to greatly filter the backscatter noise of the optical fiber, and can solve the problems of having too low SNR due to backscatter influence when the sensing distance is long. Meanwhile, the present invention also provides a positioning method for applying the system, which obtains the TFD of the disturbance frame signals by using the time-frequency analysis method based on the short-term average frequency, and takes the points near the point of maximum frequency as the effective signal segment for performing cross-correlation time delay estimation, thus obtaining the delay, and the disturbance position. The method of the invention positions the asymmetric disturbance frame signals in the systems, thus having a high positioning accuracy and reliability.

DETAILED DESCRIPTION OF THE PRESENT INVENTION

Figure 1:
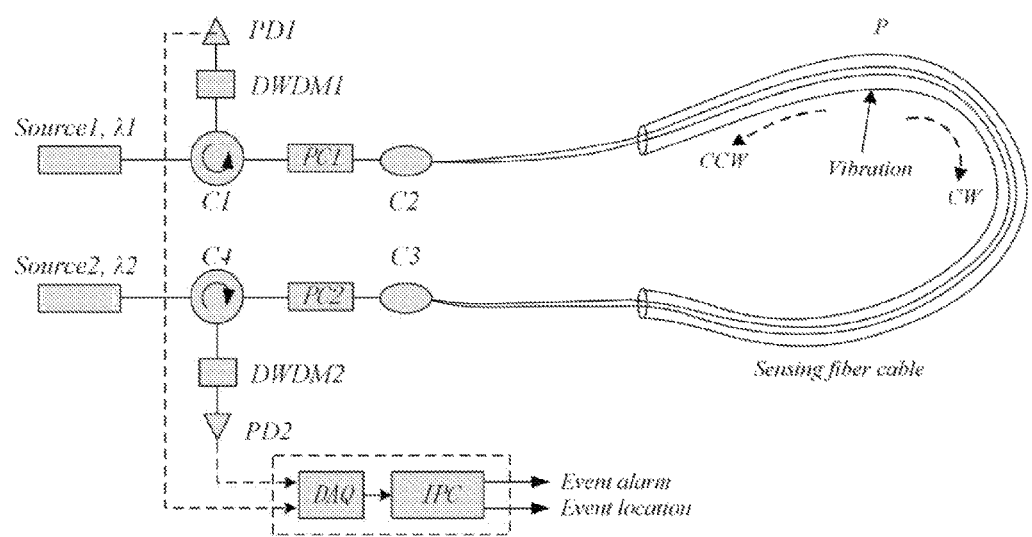
FIG. 1 is a positioning schematic diagram of a distributed optical fiber disturbance positioning system of the present invention.

1. The principle of the distributed optical fiber disturbance positioning system based on the asymmetric dual Mach-Zehnder interference is as follows:

The distributed optical fiber disturbance positioning system based on the asymmetric dual Mach-Zehnder interference is shown in FIG. 1, two light beams emitted from optical sources 1, 2 transmit in the sensing loop along the clockwise and counterclockwise directions respectively, and interference in the coupler of the respective opposite end. The light transmission path emitted from the optical source 1 is C1-PC1-C2-C3-C4-DWDM2-PD2, and the light transmission emitted from the optical source 1 is C4-PC2-C3-C2-C1-DWDM1-PD1. Wherein, C1 and C4 are circulators, C2 and C3 are 3 dB couplers, PC1 and PC2 are polarization controllers, DWDM1 and DWDM2 are dense wavelength division multiplexers, PD1 and PD1 are photoelectric detectors. Setting the times at which the two photoelectric detectors PD1 and PD2 detect the same disturbance event as $t_1$ and $t_2$ respectively, $d = t_1 - t_2$, L is the length of the sensing cable; x is the position from the disturbance point to the coupler C2, of which positioning formula is:

$$x = (L - vd)/2$$

Wherein, v is transmitting speed of an optical wave in a single-mode fiber, unit is m/s, and $v = c/n$, c is the light speed in vacuum ($3 \times 10^8$ m/s), n is refractive index of optical fiber.

2. The present invention also provides a high-precision positioning method for applying the above system:

In traditional dual Mach-Zehnder distributed optical fiber disturbance sensing system, delay d is achieved by performing cross-correlation estimation to the two interference signals; whereas in the asymmetric dual Mach-Zehnder distributed optical fiber disturbance sensing system of the present invention, due to optical sources 1, 2 having different wavelength, the two interference signals detected by detectors PD1, PD2 are inconsistence thus cannot achieve delay estimation via performing cross-correlation estimation. The two interference signals can be expressed as:

$$\begin{cases} I_1(t) = \cos\left[2\pi \cdot \dfrac{f(t)}{\lambda_2} + \phi_1\right] + n_1(t) \\ I_2(t) = \cos\left[2\pi \cdot \dfrac{f(t-d)}{\lambda_1} + \phi_2\right] + n_2(t) \end{cases}$$

Wherein, $I_1(t)$, $I_2(t)$ are optical intensity of two interference signals, $\lambda_1$, $\lambda_2$ are wavelength of optical sources 1, 2 respectively, f(t) is the optical path difference caused by disturbance, $\varphi_1$, $\varphi_2$ are initial phase differences, and $n_1(t)$, $n_2(t)$ are noise of respective circuit. Under the condition of filtering the circuit noise, the frequency of $I_1(t)$, $I_2(t)$ are directly proportional to f(t) and f(t-d). Therefore, the method of the present invention obtains the TFD of the two signals first, and then performs normalization and cross-correlation estimation on the TFD of the two signals, thus obtaining the delay d.

The present invention adopts dual-threshold zero-crossing detecting method to filter the circuit noise and find out the zero-crossing position of the disturbance frame signals first, and then estimates the average frequency of the signal segment according to the reciprocal of the signal points which near the zero-crossing point, and performs spline differential fitting for three times on the average frequency points to achieve signal TFD, and finally, performs cross-correlation estimation on the TFD curve to obtain delay d. The detailed algorithmic flow is as follows:

(1) Setting a pair of thresholds $\delta_1$, $\delta_2$ and an amplitude threshold $\varepsilon$, wherein $\delta_1 < 0$, $\delta_2 > 0$, and $|\delta_1| = |\delta_2| = \varepsilon$ (for filtering the circuit noise, $2\varepsilon$ is to be greater than the amplitude of noise). For any threshold, the formula of solving the over-threshold point position is as follows:

$$\begin{cases} C_i(m) = m \cdot \phi\{[x(m) - \delta_i < 0] \& [x(m+1) - \delta_i > 0]\} \\ \phi[x(n)] = \begin{cases} 1, & x(n) > 0 \\ 0, & x(n) = 0 \end{cases}, m, n \in [1, N-1], i = 1, 2 \end{cases}$$

Wherein, x(m) is the amplitude of $m^{th}$ point in the signal segment, $C_i(m)$ is the over-threshold point position, substituting $\delta = \delta_1$, $\delta = \delta_2$ into above formula and sequentially processing the signals with a frame point N so as to achieve respective over-threshold point positions $C_i(m)$ and $C_2(n)$, m,n $\in$ [1, N−1];

(2) Sequencing the items greater than 0 between $C_i(m)$ and $C_2(n)$ from small to large, and selecting the two adjacent items satisfying $C_i(m) < C_2(n)$ to determine zero-crossing position Z(k) of signal, wherein $Z(k) = [C_i(m) + C_2(n)]/2$, k=1, 2,3 . . . , the short-term average frequency of the signals located between two adjacent zero-crossing position can be expressed as: f(k)=1/[Z(k+1)−Z(k)].

(3) Performing spline differential fitting for three times on the solved short-term average frequency points, and the fitting curve represents the time-frequency distribution of the signal; taking the points near the point of maximum frequency as the effective signal segment, and performing normalization on the time-frequency distribution curve of two effective signals and performing cross-correlation estimation in the time domain thereof, thus obtaining the delay d, and the disturbance position x.

Figure 2:
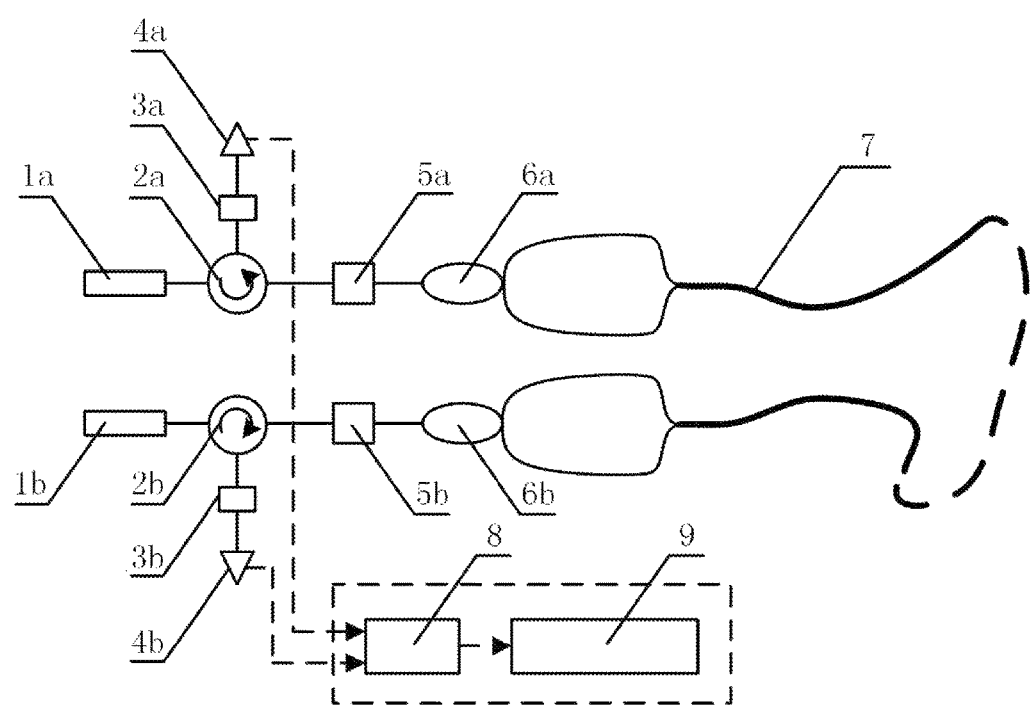
FIG. 2 is a schematic diagram of a distributed optical fiber disturbance positioning system of the present invention.

Embodiment 1: The Distributed Optical Fiber Disturbance Sensing System for Positioning The structure of the sensing system of the present invention is shown in FIG. 2, comprising the following 9 components:

Optical sources 1a, 1b: two narrow-bandwidth DFB lasers into 1550 nm wavelength range, wavelength difference of two optical sources is larger than the wavelength interval of DWDM;

Optical circulators 2a, 2b: transmitting the light emitted from the optical source to the material to be tested and collecting the reflected signal light; the circulators can be replaced by optical fiber couplers when large optical source power is applied;

DWDMs 3a, 3b: two commercial single-channel DWDMs into the 1500 nm operating wavelength range, the spectral transmission range of 3a comprises central wavelength of the optical source 1b, while the spectral transmission range of 3a comprises central wavelength of the optical source 1b;

PDs 4a, 4b: InGaAs photoelectric detectors, for receiving optical signals and performing photoelectric conversion and amplification;

Optical fiber couplers 5a, 5b: 3 dB optical fiber couplers, of which coupling ratio is 1:2;

Polarization controllers 6a, 6b: regulating polarization states of two interference signals to ensure signal visibility;

Sensing cable 7: G.652D communication cable, for acquiring external disturbance and transmitting optical signals;

DAQ card 8: dual-channel DAQ card with sampling rate of 10 MS/s, for collecting the voltage signals of two PDs 4a, 4b and then transmitting them into computer for processing;

Processing unit 9: including general computer and embedded computing system, the process unit is used for processing the interference signals received by the DAQ card for obtaining the disturbance information.

Embodiment 2: The Distributed Optical Fiber Sensing Positioning Algorithm Based on Zero-Crossing Analysis As shown in FIG. 2, the DAQ card collects two signals and then transmits them into computer for processing. The computer obtains the TFD of the disturbance frame signals by using the time-frequency analysis method based on the short-term average frequency, and takes the points near the point of maximum frequency as the effective signal segment for performing cross-correlation time delay estimation.

The algorithm process of the system shown in FIG. 2 will be further described by the following positioning example:

Setting the system parameters as follows: total length of sensing fiber is 61 km, comprising 1 km armored cable an 60 km bare fiber; the wavelengths of optical sources 1a, 1b are 1550.74 nm and 1549.95 nm respectively, the power thereof are both of 10 mV; the central wavelengths of two DWDMs are 1550.12 nm and 1550.92 nm respectively, the bandwidths thereof are both of ±0.22 nm; sampling frequency of DAQ card is 10 M/s, sampling time thereof is 0.3 s, and the sampling time corresponding to the effective number of the signal points is set to 0.02 s.

Figure 3:
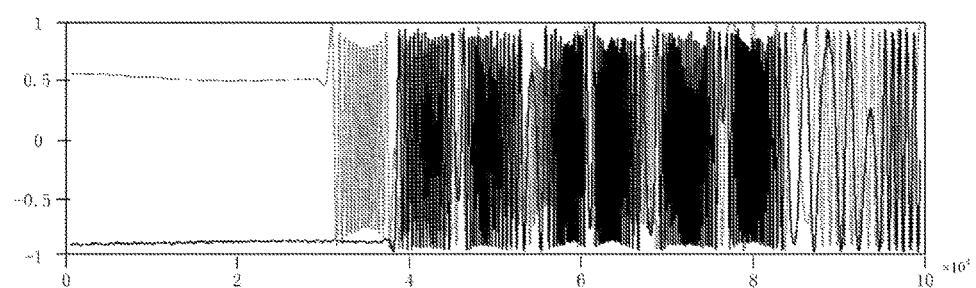
FIG. 3 is an original signal diagram of the disturbance frame signals.
Figure 4:
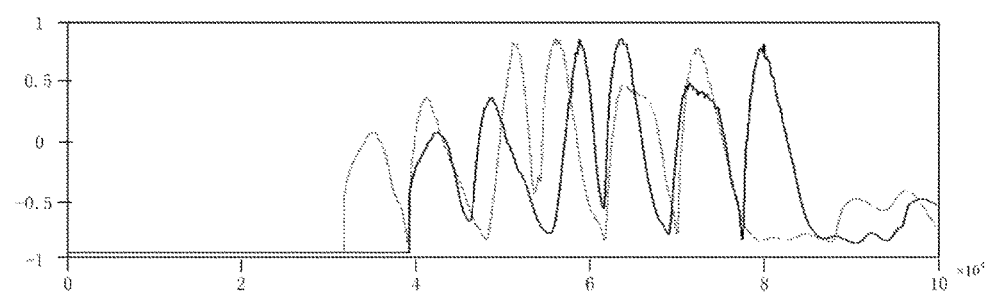
FIG. 4 is a time-frequency distribution diagram of the disturbance frame signals.

FIG. 3 shows the original signal acquired by the system when tapped the cable at 800 m of the cable, the signals in the shape of broken line and the solid line show that the signals have high SNR, and there is a clear delay difference between the two signals. FIG. 4 shows the time-frequency distribution diagram of the signals. It can be found that the TFD curves of the broken line and solid line are basically the same, so the delay can be obtained by using the cross-correlation.

For verifying the effectiveness of the algorithm, 200 times of positioning experiments are performed by tapping the cable at 800 m of the cable, and the distribution of positioning error is shown in the following table.

| | Positioning error | | | |
|---|---|---|---|---|
| | 0~±20 m | 20~±50 m | ±50~±100 m | >±100 m |
| Percentage | 51.2 | 30.6 | 11.4 | 6.8 |

Within the sensing distance of 61 km, the probability of positioning error within 50 m is up to 80%, the mean square error is 42.25 m. Therefore, the present invention has a high positioning accuracy and reliability.

What is claimed is:

1. A distributed optical fiber disturbance positioning system based on the asymmetric dual Mach-Zehnder interference, wherein the system comprises:
   Optical source: two narrow-bandwidth distributed feedback lasers into 1550 nm wavelength range, wavelength difference of two optical sources is larger than the wavelength interval of dense wavelength division multiplexer (short for DWDM) of the system;
   Optical circulator: transmitting the light emitted from the optical source to the material to be tested and collecting the reflected signal light;
   DWDM: two commercial single-channel DWDMs into the 1500 nm operating wavelength range, each spectral transmission range thereof only comprises wavelength of one optical source;
   Photoelectric detector (short for PD): InGaAs PD, for receiving optical signals and performing photoelectric conversion and amplification;
   Optical fiber coupler: 3 dB optical fiber coupler of which coupling ratio is 1:2;
   Polarization controller: regulating polarization states of two interference signals to ensure signal visibility;
   Sensing cable: G.652D communication cable, for acquiring external disturbance and transmitting optical signals;
   Data acquisition (DAQ) card: dual-channel DAQ card with sampling rate of 10 MS/s, for collecting the voltage signals of two PDs and then transmitting them into computer for processing;
   Processing unit: including general computer and embedded computing system, the process unit is used for processing the interference signals received by the DAQ card for obtaining the disturbance information.

2. The distributed optical fiber disturbance positioning system based on the asymmetric dual Mach-Zehnder interference according to claim 1, wherein backscattering light filter composed by the optical source and corresponding DWDM is a combination of any wavelength light source and optical filter.

3. The distributed optical fiber disturbance positioning system based on the asymmetric dual Mach-Zehnder interference according to claim 1, wherein, adopting optical fiber couplers instead of optical circulators when large optical source power is applied.

4. A positioning method for applying the system according to claim 1, wherein:

obtaining the time-frequency distribution (short for TFD) of the disturbance frame signals by using the time-frequency analysis method based on the short-term average frequency, and taking the points near the point of maximum frequency as the effective signal segment for performing cross-correlation time delay estimation, thus obtaining the delay d, and the disturbance position x; the specific algorithm flow is as follows:

(1) Setting a pair of thresholds $\delta_1$, $\delta_2$ and an amplitude threshold $\varepsilon$, wherein $\delta_1<0$, $\delta_2>0$, and $|\delta_1|=|\delta_2|=\varepsilon$; for any threshold, the formula of solving the over-threshold point position is as follows:

$$\begin{cases} C_i(m) = m \cdot \phi\{[x(m) - \delta_i < 0] \& [x(m+1) - \delta_i > 0]\} \\ \phi[x(n)] = \begin{cases} 1, & x(n) > 0 \\ 0, & x(n) = 0 \end{cases}, m, n \in [1, N-1], i = 1, 2 \end{cases}$$

Wherein, $x(m)$ is the amplitude of $m^{th}$ point in the signal segment, $C_i(m)$ is the over-threshold point position, substituting $\delta=\delta_1$, $\delta=\delta_2$ into above formula and sequentially processing the signals with a frame point N so as to achieve respective over-threshold point positions $C_1(m)$ and $C_2(n)$, m,n$\in$ [1, N−1];

(2) Sequencing the items greater than 0 between $C_i(m)$ and $C_2(n)$ from small to large, and selecting the two adjacent items satisfying $C_i(m)<C_2(n)$ to determine zero-crossing position Z(k) of signal, wherein $Z(k)=[C_i(m)+C_2(n)]/2$, k=1, 2, 3 ..., the short-term average frequency of the signals located between two adjacent zero-crossing position can be expressed as: $f(k)=1/[Z(k+1)-Z(k)]$.

(3) Performing spline differential fitting for three times on the solved short-term average frequency points, and the fitting curve represents the time-frequency distribution of the signal; taking the points near the point of maximum frequency as the effective signal segment, and performing normalization on the time-frequency distribution curve of two effective signals and performing cross-correlation estimation in the time domain thereof, thus obtaining the delay d, and the disturbance position x.

5. The positioning method according to claim 4, wherein the TFD curve of the disturbance frame signals can be obtained by any prior time-frequency analysis method, and then the method obtains delay d by cross-correlation, and obtains disturbance position x.

\* \* \* \* \*